(12) United States Patent
Sachse

(10) Patent No.: US 11,614,344 B1
(45) Date of Patent: Mar. 28, 2023

(54) DEVICE AND METHOD FOR DETERMINING AN ANGULAR POSITION OF INDUCTIVE POSITION SENSOR

(71) Applicant: Melexis Technologies SA, Bevaix (CH)

(72) Inventor: Eric Sachse, Dresden (DE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 18/080,370

(22) Filed: Dec. 13, 2022

(30) Foreign Application Priority Data

Dec. 20, 2021 (EP) ..................................... 21215974

(51) Int. Cl.
*G01D 5/20* (2006.01)

(52) U.S. Cl.
CPC ................................... *G01D 5/204* (2013.01)

(58) Field of Classification Search
CPC ............ G01D 5/20; G01D 5/204; G01D 5/22; G01D 5/225; G01D 5/2275; G01D 5/2291; G01D 5/2448; G01D 5/24476; G01P 3/44; G01P 3/488; G01P 3/489; G01R 33/0029
See application file for complete search history.

(56) References Cited

U.S. PATENT DOCUMENTS

| | | | |
|---|---|---|---|
| 2014/0316733 A1 | 10/2014 | Mori et al. | |
| 2014/0354271 A1* | 12/2014 | Kawase | G01D 5/2451 324/207.25 |
| 2015/0280648 A1* | 10/2015 | Vitali | H03M 1/12 327/355 |
| 2017/0343382 A1* | 11/2017 | Fukumura | H02K 11/215 |

FOREIGN PATENT DOCUMENTS

| | | |
|---|---|---|
| EP | 3503405 A2 | 6/2019 |
| EP | 3885709 A1 | 9/2021 |
| EP | 4047323 A1 | 8/2022 |
| JP | 2017151061 A | 8/2017 |

OTHER PUBLICATIONS

Extended European Search Report from corresponding European Patent Application No. EP 21215974.3, dated Jun. 3, 2022.

* cited by examiner

*Primary Examiner* — Steven L Yeninas
(74) *Attorney, Agent, or Firm* — Workman Nydegger

(57) ABSTRACT

A method of determining an angular position of a target of an inductive angular position sensor system, relative to a substrate, includes the steps of: receiving, demodulating and digitizing signals, and reducing a DC-offset of the digital signals, and determining an angular position. The step of reducing the DC-offset involves: i) initializing a DC-correction value; ii) subtracting the DC-correction value to obtain DC-shifted signals; iii) clipping the DC-shifted-signals to obtain clipped signals; iv) calculating a first sum by summing values of the clipped signal over one period, and v) calculating a second sum by summing absolute values of the clipped signal over said period; vi) adding to each DC correction value K times the first sum divided by the second sum, where K is a predefined constant.

13 Claims, 10 Drawing Sheets

$$\begin{cases} \text{In0} = \frac{1}{\sqrt{3}} A_{rotor} \sin\left(\emptyset - \frac{1}{6}\pi\right) \\ \text{In1} = \frac{1}{\sqrt{3}} A_{rotor} \sin\left(\emptyset - \frac{5}{6}\pi\right) \\ \text{In2} = \frac{1}{\sqrt{3}} A_{rotor} \sin\left(\emptyset - \frac{9}{6}\pi\right) \end{cases}$$

$$\begin{cases} In0 = A_0 \, sin\left(\emptyset - \frac{1}{6}\pi\right) + A_{asym0} \\ In1 = A_1 \, sin\left(\emptyset - \frac{5}{6}\pi\right) + A_{asym1} \\ In2 = A_2 \, sin\left(\emptyset - \frac{9}{6}\pi\right) + A_{asym2} \end{cases}$$

$s0 = 0+1+1+1+1+1+1+0+0 -1 -1 -1 -1+0 = +2$   >0, thus DC0 has to ↗
$a0 = 0+1+1+1+1+1+1+0+0+1+1+1+1+0 = 10$ (assume K=0.3), then:
$DC0 := DC0 + K*(s/a) = 0+(0.3)*(2/10) = 0.060$ $s0 = 0+2+3+3+3+3+2+0 -1 -2 -3 -3 -2+0+1 = +6$   >0, thus DC0 has to ↗
$a0 = 0+2+3+3+3+3+2+0+1+2+3+3+2+0+1 = 28$ (assume K=0.4), then:
$DC0 := DC0 + K*(s/a) = 0+(0.4)*(6/28) = 0.085$

DEVICE AND METHOD FOR DETERMINING AN ANGULAR POSITION OF INDUCTIVE POSITION SENSOR

FIELD OF THE INVENTION

The present invention relates in general to the field of inductive angular position sensor systems, and in particular to a method of determining an angular position of an inductive angular position sensor system, and a sensor device configured for applying such a method.

BACKGROUND OF THE INVENTION

Various inductive angle sensors are known in the art, for example for motor control purposes. They typically comprise a printed circuit board with an excitation coil (also known as "transmitter coil") and multiple detection coils (also known as "receiver coils"). The transmitter coil and the receiving coils are inductively coupled to one another. The amount of coupling may be influenced by a coupling element (also known as "target") movably mounted in the vicinity of the transmitter and receiver coils. The excitation coil may for example be excited with an AC signal, which induces eddy currents in the target. The receiving coils will generate signals caused by the eddy currents in the target and the current in the transmitting coil. The signals from the receiving coils are analysed in an electronic circuit, and an angular position can be determined based on these signals in known manners.

Different kinds of inductive angle sensors exist. The shape and size and number of coils may vary, as well as the shape and size of the target. The present invention is related primarily to inductive sensor systems that provide a three-phase signal, i.e. provide three sinusoidal signals which are substantially 120° phase shifted, but can also be used for two-phase signals, i.e. systems that provide two sinusoidal signals which are substantially 90° phase shifted.

Ideally these two or three signals are perfect sine signals, ideally, they have exactly the same amplitude, ideally the amplitude of the signals is constant over time, ideally the signals have a DC-value which is exactly equal to zero, and ideally the amplitude(s) and the DC-value(s) are insensitive to the presence of metal objects in the vicinity of the sensor. In practice, however, this is not the case, and the amplitudes may vary over time and be different from each other, and the DC-values may vary over time and be different from zero.

There is a need to provide an inductive angular sensor which can provide an accurate angular value despite such anomalies.

SUMMARY OF THE INVENTION

It is an object of embodiments of the present invention to provide a method of determining an angular position of a target of an inductive angular position sensor system.

It is an object of embodiments of the present invention to provide a method which is relatively easy to perform, and/or which is less computationally intensive.

It is an object of embodiments of the present invention to provide a method of offset-compensation in an inductive angular position sensor system.

It is an object of embodiments of the present invention to provide a method of offset-compensation which is less sensitive to amplitude-variations.

It is also an object of embodiments of the present invention to provide an angular position device configured for performing such a method.

It is also an object of embodiments of the present invention to provide an angular position sensor system comprising such an angular sensor device, configured for performing such a method, except the mechanical movement of the target.

These and other objects are accomplished by a method, an angular position sensor system, and by an angular position sensor device according to embodiments of the present invention.

According to a first aspect, the present invention provides a method of determining an angular position of a target of an inductive angular position sensor system, wherein the inductive angular position sensor system further comprises: a substrate with at least one transmitter coil and a plurality of receiver coils, and a target which is movable relative to said substrate, the method comprising: a) receiving a plurality of input signals from said receiver coils; b) demodulating and optionally pairwise subtracting said plurality of input signals, and providing a plurality of sinusoidal baseband signals, each having a respective amplitude and a respective DC-offset; c) digitizing said plurality of sinusoidal baseband signals or digitizing pairwise difference signals derived therefrom, and providing a set of digital signals; d) reducing or substantially removing the respective DC-offset-value for each of the digital signals in an iterative manner, thereby providing a plurality of DC-compensated signals; e) determining an angular position of the target based on the DC compensated signals; wherein step d) comprises: i) initializing a DC correction value; ii) subtracting the DC correction value from the digital signal to obtain a DC-shifted signal; iii) clipping the DC-shifted-signal to obtain clipped signals; iv) calculating a first sum by summing values of the clipped signal over one period; v) calculating a second sum by summing absolute values of the clipped signal over said period; vi) adjusting the DC-correction value by a function of a ratio of the first sum and the second sum.

It is an advantage of this method that the DC offset correction can be performed in the digital domain, thus reducing component cost of the analog circuit, since e.g. a high-pass filter can be omitted.

It is an advantage of this method, that the DC offset value is determined and corrected dynamically (as opposed to "determined only once during calibration", stored in a non-volatile memory, and used later), because dynamic determination and correction will still work when the DC offset drifts over time and temperature, or because of a varying environment, e.g. metal objects being placed or removed in the vicinity of the inductive sensor.

It is an advantage that the DC offset is determined iteratively, because this allows to gradually increase or decrease the DC offset value, which acts like a kind of low-pass filtering.

It is a major of calculating the first sum and second sum over a clipped version of the DC-shifted baseband signal, rather than on the baseband signal itself, because in this way, the DC-correction value is less dependent of the amplitude of the sinusoidal signal. In other words, it renders the method "highly insensitive to amplitude variations". This method is particularly useful when the amplitude of the sinusoidal signals can vary by about ±20% over time, even over a relatively small number of periods.

It is an advantage of updating the current DC value by a value proportional to the ratio of the first sum and the second sum, (rather by the constant K) because it allows fine-tuning of the DC-correction updates.

In an embodiment, step d) comprises: i) initializing each DC offset value to a predefined value; and repeatedly performing the following steps: ii) subtracting the DC-correction value from the respective digital signal, thereby obtaining DC-shifted signals; iii) clipping the DC-shifted-signals to a predefined symmetrical range, thereby obtaining clipped signals; iv) calculating the first sum value by summing values of the clipped signal over one period of the respective signal; v) calculating the second sum value by summing absolute values of the clipped signal over said one period; vi) updating the DC-correction values using the following formulas: DC0:=DC0+K*(s0/a0); DC1:=DC1+K*(s1/a1); DC2:=DC2+K*(s2/a2); where ":=" is an assignment operator; s0, s1, s2 are the first sum values; a0, a1, a2 are the second sum values; and K is a predefined constant; and going back to step ii).

With "symmetrical range" is meant that a range that extends from a negative value to a positive value, both having the same absolute value, thus the value of zero being located in the middle of the symmetrical range.

In an embodiment, the method further comprises: providing an AC signal for exciting said transmitter coil; and the demodulation of step b) is performed in synchronism with said AC signal.

In an embodiment, the plurality of sinusoidal baseband signals or the plurality of pairwise difference signals are three-phase signals.

In an embodiment, step b) comprises: converting the three-phase signals to quadrature signals (e.g. using a Clarke transform); and determining the angular position using an arctangent function of a ratio of the quadrature signals.

In an embodiment, step c) comprises: digitizing said signals using an analog-to-digital convertor that provides at least 12 bits; and wherein step iii) comprises: providing the clipped values with at most 8 bits, or at most 5 bits.

It is an advantage of dropping at least 4 bits that the accumulator can be implemented using fixed-point arithmetic, while the risk of "overflow" is reduced.

In an embodiment, step c) comprises: digitizing said signals using an analog-to-digital convertor that provides at least 12 bits; and step iii) comprises: providing the clipped values with at least 2 bits, or at least 3 bits, or at least 4 bits.

With 2 bits, the clipped signal can take one of the following values: −1, 0, +1.

With 3 bits, the clipped signal can take one of the following values: −3, −2, −1, 0, +1, +2, +3, etc.

In an embodiment, an amplitude of the symmetrical range is a value from about 75% to about 85% of the nominal or average value of the signal amplitude.

It was found, in an embodiment of an inductive angular sensor system, that the amplitude of the sinusoidal signals varied over time by about ±10% around an envisioned amplitude, or nominal amplitude. It was found that, by clipping the signals to a symmetrical range such that about 20% of the positive part and the upper and lower part of the signal to a range which is smaller than (twice) the maximum amplitude of the sinusoidal signal, a top part and a bottom part are always "cut away", and it was found that the resulting DC-value was less dependent on the varying amplitude.

In an embodiment, step iii) further comprises: dynamically adjusting the symmetrical range such that an amplitude of the symmetrical range is a value from about 75% to about 85% of the nominal or average value of the signal amplitude.

In an embodiment, the minimum and maximum value of the symmetrical range is dynamically adjusted such that it corresponds to about 80% of the nominal or (short term) average value of the amplitude.

In an embodiment, the method further comprises estimating or calculating an angular speed of the target.

In an embodiment, step c) comprises: digitizing said signals using an analog-to-digital convertor that provides at least 12 bits; and step iii) comprises: providing the clipped values with a number of bits in the range from 2 to 8, the number of bits being dynamically adjusted depending on the estimated speed.

For example, in an embodiment the speed is compared to one threshold value, and if the actual speed is lower than the threshold, the number of bits is reduced from 12 to 8, and if the speed is higher than the threshold, the number of bits is reduced from 12 to 5.

By doing so, the DC-correction value can be determined with a higher number of bits when the target is rotating at lower speed (resulting in a more accurate DC offset correction); while the risk of "accumulator overflow" can be reduced when the target is rotating at higher speed.

In an embodiment, the moment of start and the moment of end of each respective period is determined based on the moment at which the DC compensated signals cross a corresponding DC offset value.

According to a second aspect, the present invention also provides an inductive position sensor device for use in an inductive angular position sensor system, wherein the inductive angular position sensor system further comprises a substrate with at least one transmitter coil and a plurality of receiver coils, and a target which is movable relative to said substrate; wherein the inductive position sensor device comprises: a plurality of inputs (e.g. input ports or input nodes) for receiving a plurality of input signals (e.g. S0, S1, S2) obtained from said plurality of receiver coils; a demodulation circuit for demodulating and optionally pairwise subtracting said plurality of input signals (e.g. S0, S1, S2), and providing a plurality of sinusoidal signals (e.g. In0, In1, In2); at least one analog-to-digital convertor for digitizing said plurality of sinusoidal baseband signals (e.g. In0, In1, In2) or for digitizing pairwise difference signals (e.g. D01, D12, D20) derived therefrom, and providing a set of digital signals (e.g. X0, X1, X2); a digital processing circuit configured for performing step d) and e) of a method according to the first aspect.

According to a third aspect, the present invention also provides an inductive position sensor system comprising: an inductive position sensor device according to the second aspect; a substrate with at least one transmitter coil and a plurality of receiver coils; a target which is movable relative to said substrate.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
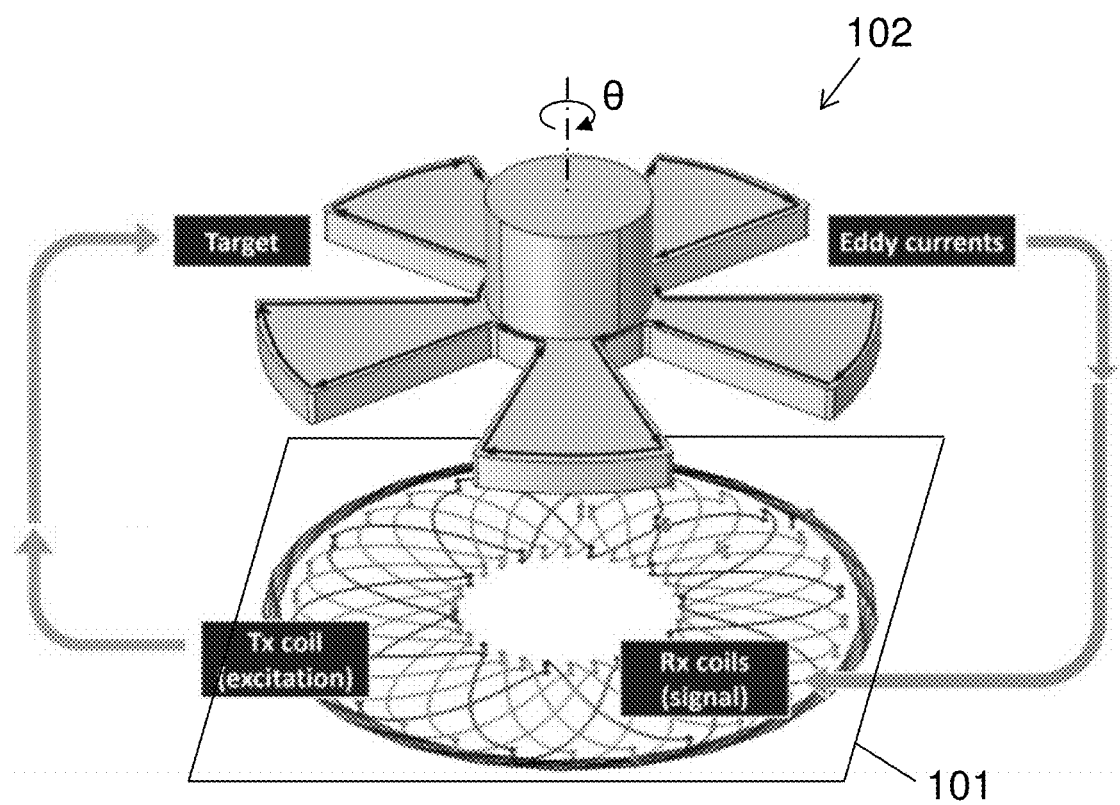
FIG. 1 shows an example of an inductive sensor arrangement, comprising: a substrate comprising a transmitter coil and a plurality of receiver coils; and a target (having five blades) movable relative to said substrate, as may be used in embodiments of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates in general to inductive angular position sensor systems. As mentioned above, they typically comprise a substrate with a (or at least one) excitation coil (also known as "transmitter coil") and a plurality of detection coils (also known as "receiver coils"), e.g. two receiver coils or three receiver coils, which are inductively coupled to the transmitter coil. The amount of coupling may be influenced by a coupling element (also known as "target") mounted in the vicinity of the transmitter and receiver coils. The excitation coil is typically excited with an AC signal, which induces eddy currents in the target. The receiving coils will generate signals (e.g. voltage signals) caused by the eddy currents in the target and by the current in the transmitting coil. The signals from the receiving coils are analysed in an electronic circuit, and an angular position can be determined based on these signals.

The present invention will be illustrated and explained mainly for an inductive angular sensor system having three receiver coils providing three modulated signals, from which three baseband signals can be derived which are 120° shifted electrically, but the present is not limited thereto, and also works for an inductive angular sensor system having only two receiver coils, providing only two modulated signals, from which two baseband signals can be derived (typically referred to as I and Q) which are 90° shifted electrically.

Figure 2:
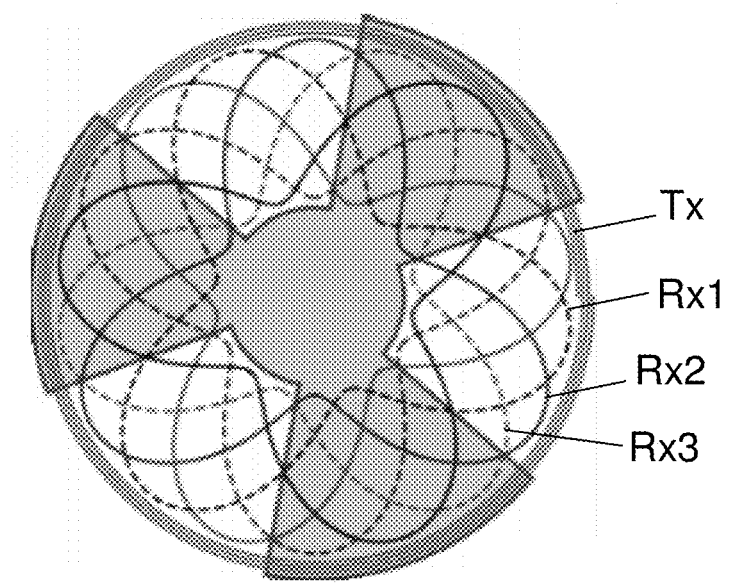
FIG. 2 shows a variant of the arrangement of FIG. 1 for a target having only three blades, as may be used in embodiments of the present invention.

Referring now to the Figures,

FIG. 1 shows a first example of an inductive sensor arrangement comprising: a substrate 101 (e.g. a printed circuit board, PCB) comprising a transmitter coil and a plurality of receiver coils; and a target 102 (e.g. a metal target) rotatable relative to said substrate. The transmitter coil Tx, and the receiver coils Rx1, Rx2, Rx3 are also illustrated in FIG. 2. In the example shown, the transmitter coil Tx describes a full circle (also referred to as an O-shape), but the present invention is not limited thereto, and also works for so called "C-shaped" coils. In the example shown, the target has five lobes (or leaves or blades) which are spaced apart by 360°/5=72°, but the present invention is not limited thereto either, and also works for targets having a different number of lobes, for example from 1 to 25 lobes, or from 2 to 22 lobes.

Figure 3:
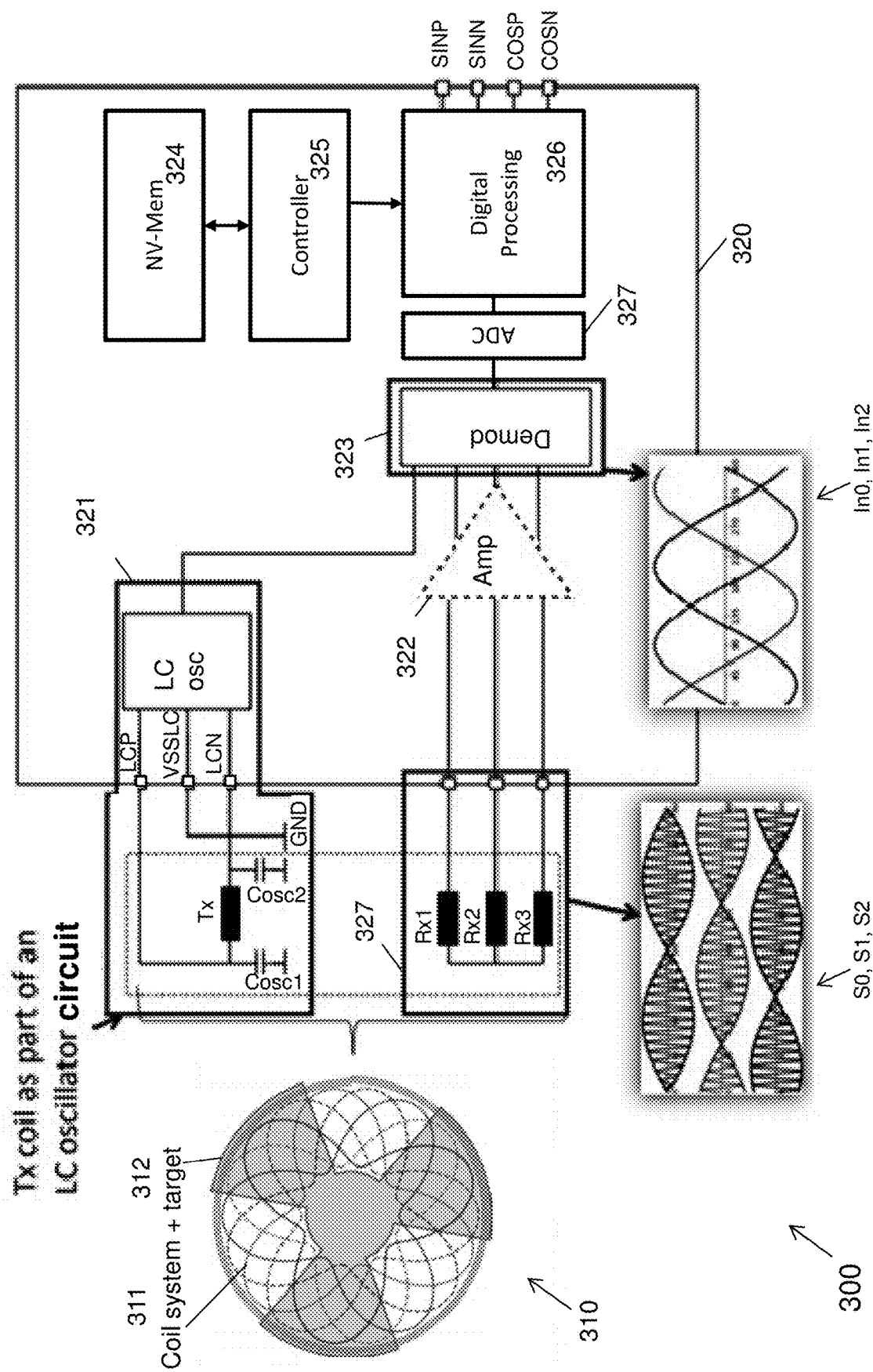
FIG. 3 shows a schematic block-diagram of an angular sensor system according to embodiments of the present invention, comprising: a substrate with at least one transmitter coil and three receiver coils, a target movable relative to said substrate, and an angular sensor device connected to said receiver coils. Methods proposed by the present invention may be performed by the digital processing circuit.

FIG. 3 shows a schematic block-diagram of an inductive angular position sensor system 300, comprising: an inductive sensor arrangement 310 comprising: a substrate (not explicitly shown in FIG. 3) with a coil system 311 comprising at least one transmitter coil TX and three receiver coils Rx1, Rx2, Rx3, and a target 312 which is rotatable relative to said coil system 311.

The sensor system 300 further comprises a sensor device 320 connected at least to said receiver coils Rx1, Rx2, Rx3 for receiving and processing the received signals. The sensor device 320 is preferably also connected to the transmitter coil TX and is preferably further configured for exciting the transmitter coil with an AC signal.

The sensor system 300 may have an oscillator circuit 321, and the transmitter coil TX may be part of that oscillator circuit, but this is not absolutely required, and the excitation may also be performed by a separate circuit, e.g. by a separate chip. The transmitter coil Tx may be excited at a frequency of about 1 MHz to about 20 MHz. The excitation frequency may be higher than, or lower than, or substantially equal to the resonance frequency of the oscillator circuit. These aspects are well known in the art but are not the main focus of the present invention, and hence need not be explained in more detail here.

The sensor device 320 is configured for receiving signals from the receiver coils Rx1, Rx2, Rx3, and optionally for amplifying these signals using amplifier 322, and for demodulating these signals in demodulator 323, yielding three baseband signals In0, In1, In2. Alternatively, the sensor device 320 may be configured for calculating pairwise difference signals, e.g. in accordance with the following formulas: D01=In0−In1; D12=In1−In2; D20=In2−In0; and for amplifying and demodulating the difference signals.

The demodulation may comprise synchronous rectification and low-pass filtering. These baseband signals are then "offset compensated" in an iterative manner, as will be described further (see e.g. FIG. 7 to FIG. 9), by digitizing the signals, clipping the signals, and by calculating a first sum and a second sum of the clipped signals, and by calculating a DC-correction value based on the first and second sum for each of the sinusoidal signals individually. This is the main aspect of the present invention.

The angle can then be computed from these offset-compensated signals, for example, using the "Clarke transformation" to convert the three-phase signals into quadrature signals, on which an arctangent operation can be performed. In the system shown in FIG. 3, the sensor device 320 may perform the Clarke Transformation, and provides a sine and cosine signal to an external processor, e.g. an ECU (not shown), which can calculate the angle therefrom. In a variant, the angle is calculated inside the sensor device 320, and may be provided to the external processor.

It is noted that the architecture shown in FIG. 3 is only an example of how the signals obtained from the receiver coils can be processed to obtain a plurality of sinusoidal baseband signals, and other architectures may also be used. The main focus of the present invention is not the demodulation aspect, but rather to provide a technique to reduce the offset of these baseband signals.

A method of offset-compensation in a static manner, based on calibration values determined during a calibration procedure is known in the prior art, e.g. from EP patent application EP21157650.9 filed on 17 Feb. 2021, but such method is not ideal when the amplitudes and/or the DC offsets may vary (or "drift") over time, e.g. due to temperature variations or proximity of metal objects or the like.

The inventors of the present invention had the task of finding a method which is less sensitive to amplitude variations, in particular, amplitude variations of about ±10% about a nominal amplitude value.

Figures 4A, 4B:
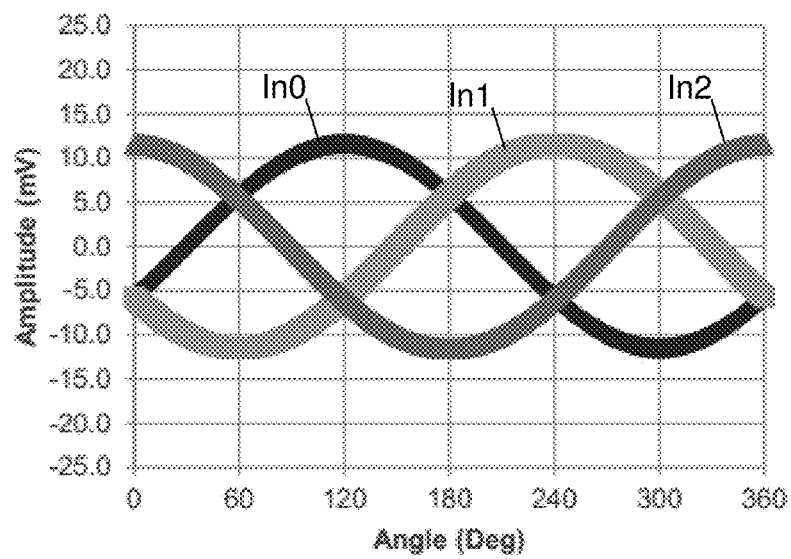
FIG. 4A shows a graph with three baseband signals, obtained by demodulating the signals obtained from the receiver coils, in an ideal situation.
FIG. 4B shows a set of three equations representing these waveforms, each having an amplitude Arotor/√3.
Figure 4C:
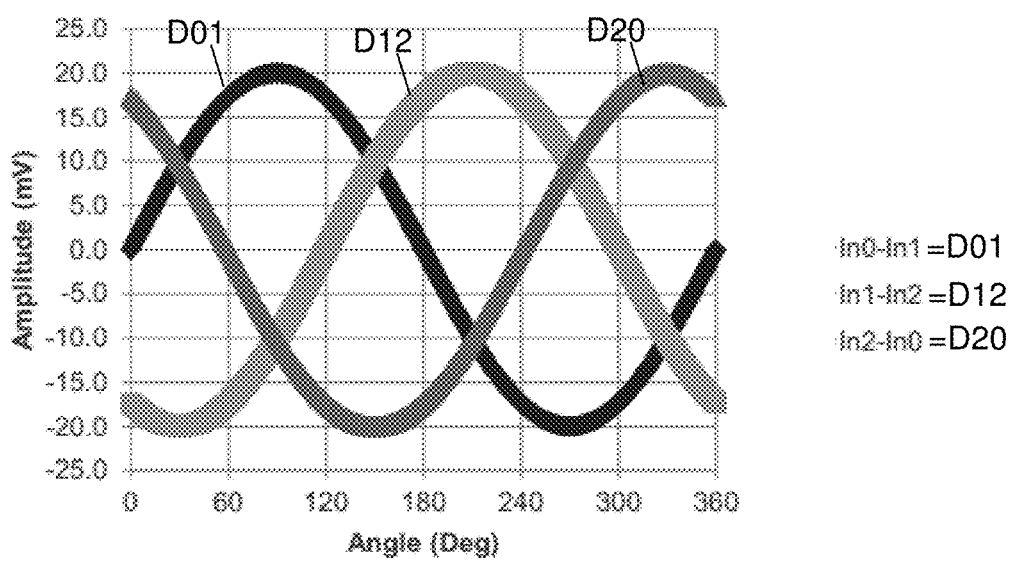
FIG. 4C shows a graph showing three pairwise differences between the baseband signals of FIG. 4A.

FIG. 4A shows a graph with three baseband signals In0, In1, In2, as may be obtained by demodulating the signals S0, S1, S2 obtained from the receiver coils Rx1, Rx2, Rx3 in an ideal situation, i.e. with identical amplitudes and with zero DC-offset. The values on the vertical axis are arbitrary values. In fact, a zero-offset is not absolutely required, and in case the signals have a same offset, such offset can easily be removed by calculating pairwise difference signals (see FIG. 4C).

FIG. 4B shows a set of three equations representing these ideal (or almost ideal) waveforms, each having an amplitude Arotor/√3, and a zero offset, and the signals being 120° phase shifted electrically with respect to each other. The angle θ represents the angular position of the target relative to the substrate. In the example shown in FIG. 4A, the DC-offset value may be equal to zero, due to the use of anti-winded receiver coils, or due to the demodulation circuit, but that is not absolutely required for the invention to work. As already mentioned, a non-zero DC-offset value can be eliminated by determining pairwise differences between the three baseband signals In0, In1, In2, as illustrated for example in FIG. 4C. Another advantage of using difference signals is that the amplitudes of the difference signals are larger than the amplitudes of the baseband signals, thus increasing the signal-to-noise ratio.

Figures 5A, 5B:
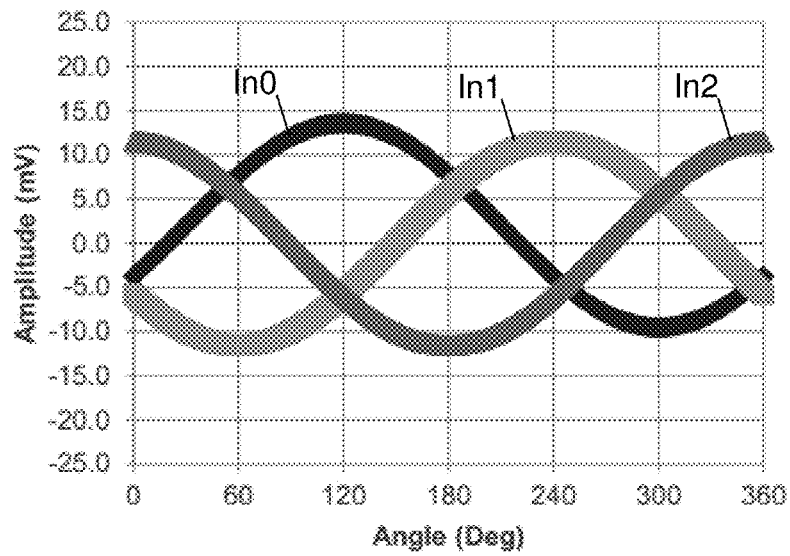
FIG. 5A shows a graph with three baseband signals, obtained by demodulating the signals obtained from the receiver coils, in a practical situation.
FIG. 5B shows a set of three equations representing these waveforms, each with an individual amplitude and with an individual DC-offset value.

FIG. 5A shows a graph with three baseband signals In0, In1, In2, as may be obtained by demodulating the signals S0, S1, S2 obtained from the receiver coils Rx1, Rx2, Rx3 in a practical situation.

FIG. 5B shows a set of three equations representing these waveforms, each having a respective amplitude A0, A1, A2, and an individual offset Aasym0, Aasym1, Aasym2, and the signals being 120° phase shifted electrically with respect to each other. The angle θ represents the angular position of the target relative to the substrate. In the illustrative example shown in FIG. 5A, Aasym0 was chosen equal to Arotor*0.1, but of course, this is only an example.

Figure 5C:
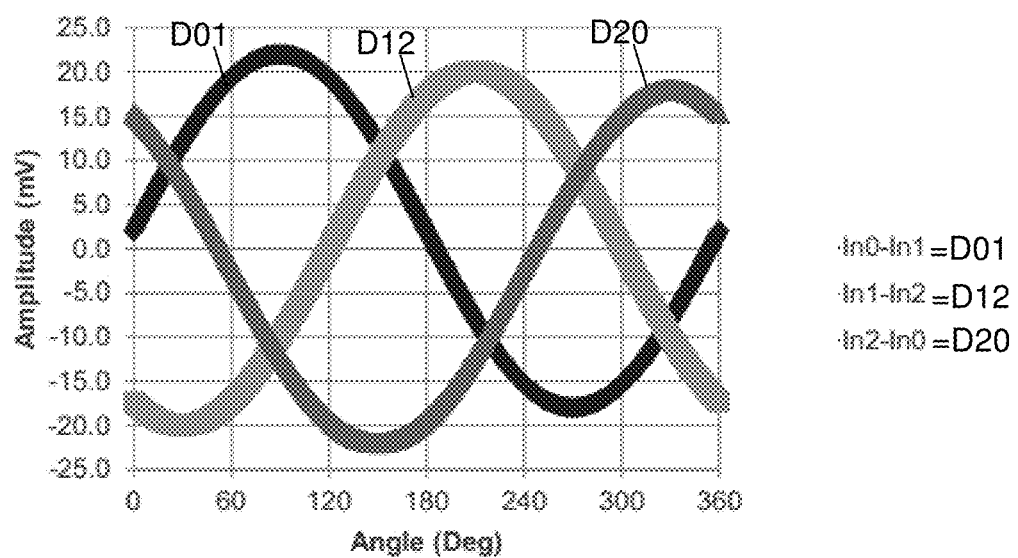
FIG. 5C shows a graph showing three pairwise differences between the baseband signals of FIG. 5A.

FIG. 5C shows a graph with pairwise difference signals in a practical situation. As can be seen, the amplitudes of these signals are not the same, and the DC-offsets are non-zero.

The above-mentioned problem may then be reformulated as "how to determine the angular position of the target of the inductive sensor arrangement, based on the non-ideal signals In0, In1, In2 of FIG. 5A or based on the non-ideal signals D01, D12, D20 of FIG. 5C.

Figure 6:
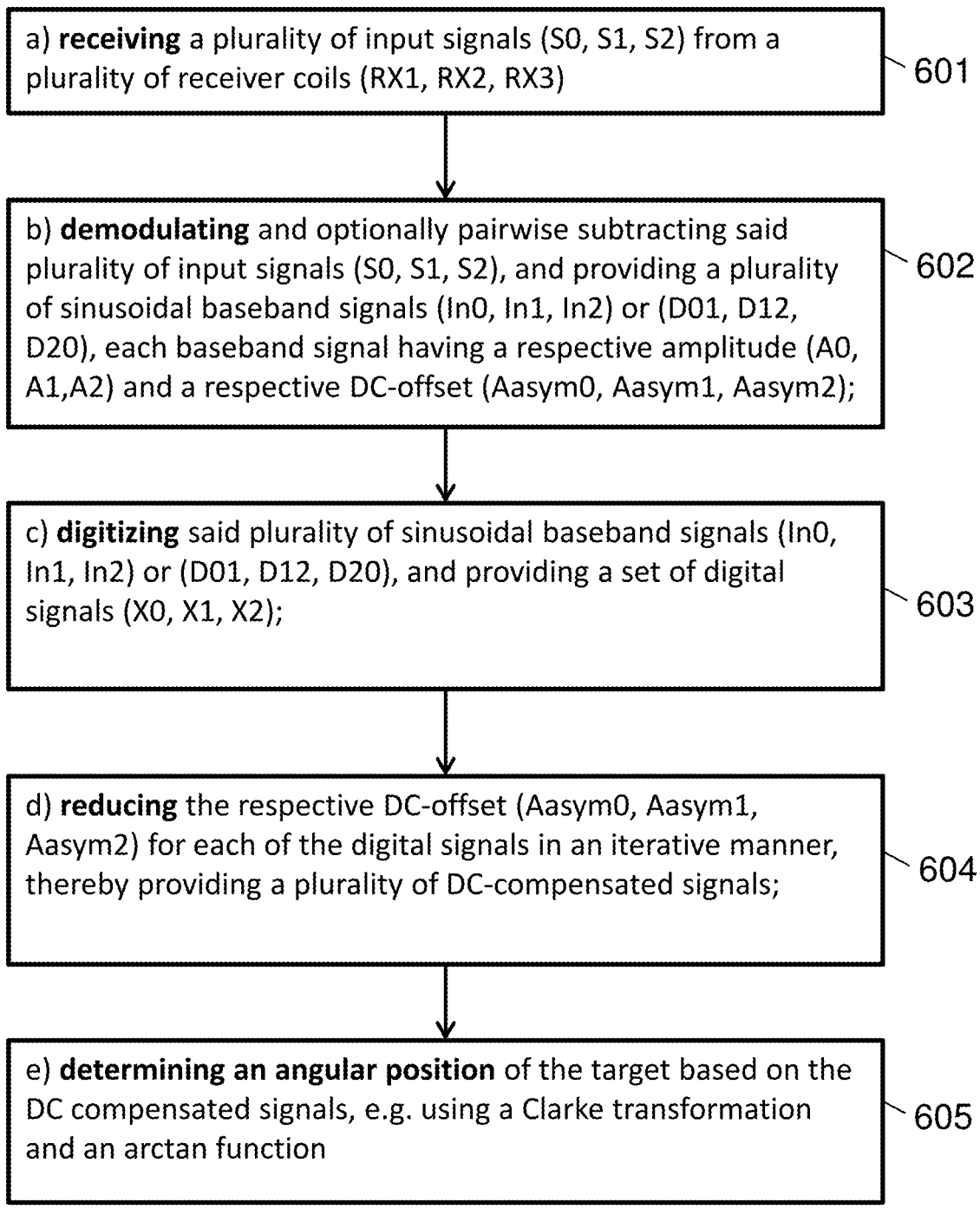
FIG. 6 shows a flow-chart of a method of determining an angular position of a target of an inductive angular position sensor.

FIG. 6 shows a flow-chart of a method 600 of determining an angular position of a target of an inductive angular position sensor, proposed by the present invention. The method comprises the following steps:

a) receiving 601 a plurality of input signals S0, S1, S2 from the receiver coils RX1, RX2, RX3;

b) demodulating 602 and optionally pairwise subtracting said plurality of input signals S0, S1, S2, and providing a set of sinusoidal baseband signals (In0, In1, In2) or (D01, D12, D20), each baseband signal having a respective amplitude A0, A1, A2 and a respective DC-offset Aasym0, Aasym1, Aasym2;

c) digitizing 603 said set of sinusoidal baseband signals (In0, In1, In2) or (D01, D12, D20), and providing a set of digital signals (X0, X1, X2);

d) reducing 604 the respective DC-offset (Aasym0, Aasym1, Aasym2) for each of the digital signals in an iterative manner, thereby providing a plurality of DC-compensated signals; (e.g. X0dcc, X1dcc, X2dcc, shown in FIG. 8);

e) determining 605 an angular position of the target based on the DC compensated signals (e.g. X0dcc, X1dcc, X2dcc, shown in FIG. 8), e.g. using a Clarke transformation and an arctangent function It is an advantage that the DC-offset is adjusted in an iterative manner, e.g. each period of each respective signal, rather than being a fixed adjustment, which was determined during a calibration procedure. Preferably, as will be explained further, the DC-off-set-adjustment is based on a clipped version of the DC-compensated signals, more in particular, based on a first sum and a second sum of samples thereof, summed over one period of the respective signals.

Figure 7:
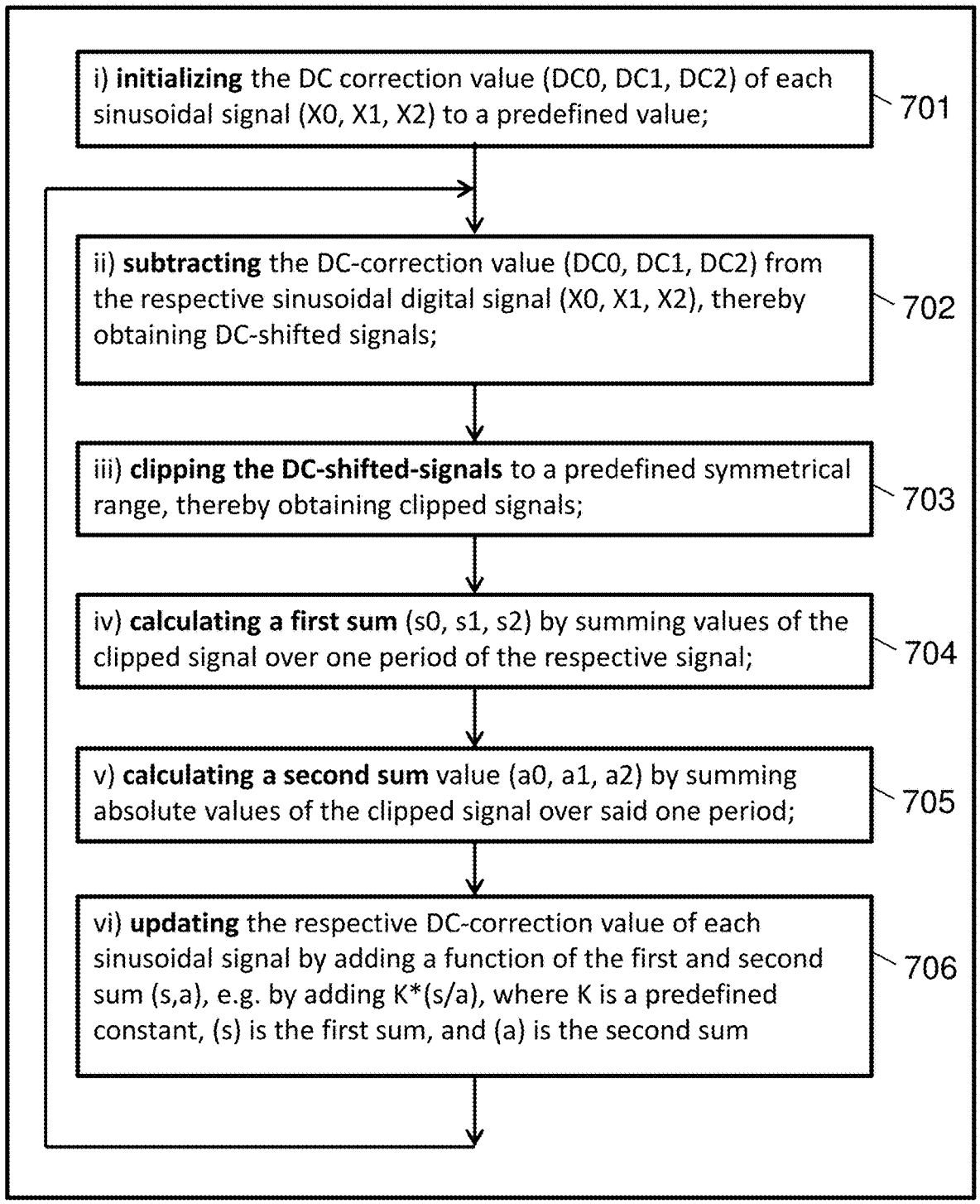
FIG. 7 shows a flow-chart of a possible algorithm to implement step d) of FIG. 6, proposed by the present invention.
Figure 8:
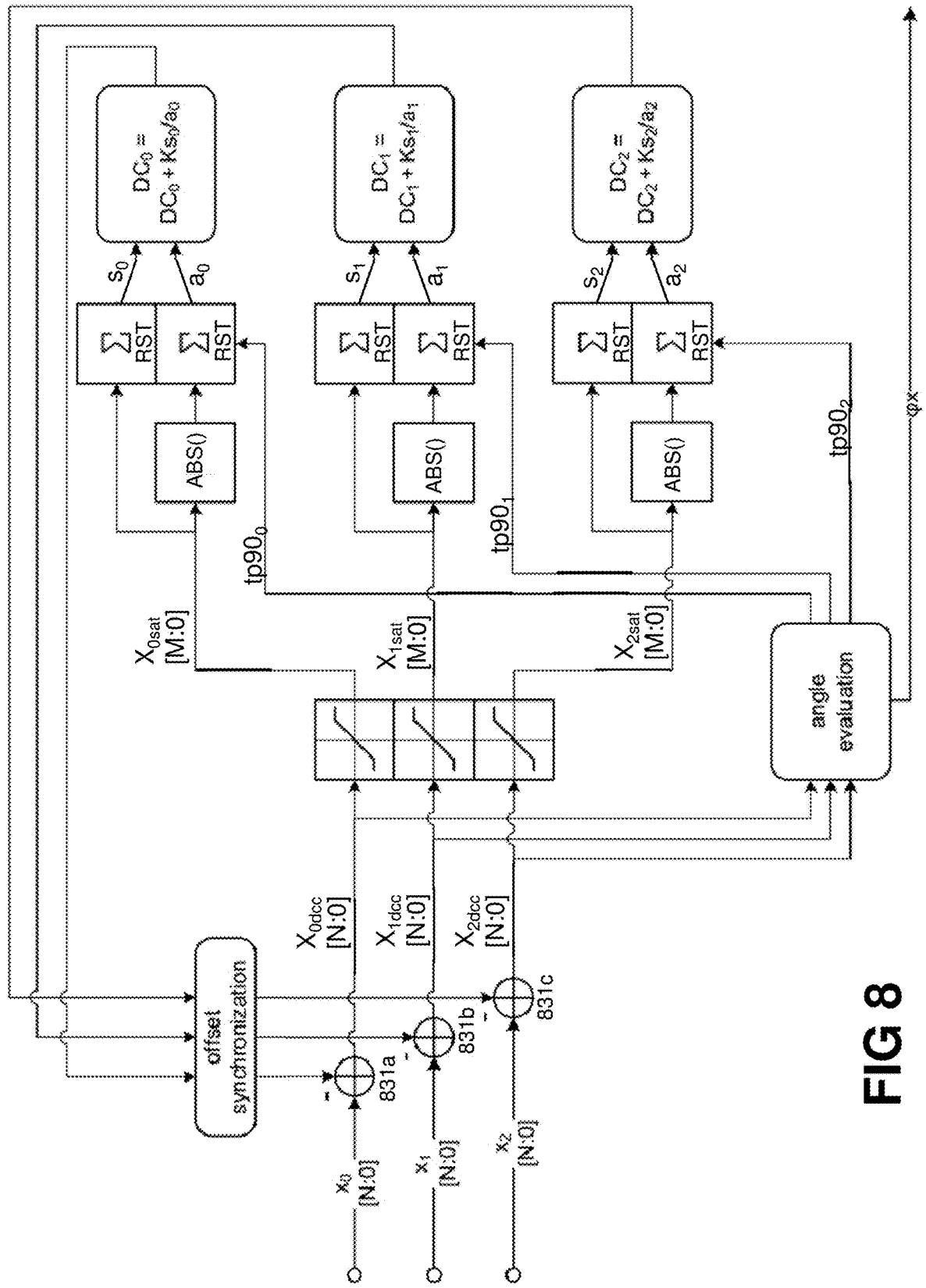
FIG. 8 shows a data-flow diagram for illustrating a method proposed by the present invention, shown in FIG. 6.

FIG. 7 shows a flow-chart of a possible algorithm 700 to implement step d) of FIG. 6, as proposed by the present invention. This algorithm can be considered a method 700 of reducing a DC-offset value of a digital sinusoidal signal, applied to each of the sinusoidal signals. The method uses three combiners (e.g. a summation or subtraction block) 831a, 831b, 831c (see FIG. 8) and three DC correction values DC0, DC1, DC2 (see FIG. 8) which are iteratively updated. The method 700 comprises the steps of:

i) initializing 701 the DC correction value DC0, DC1, DC2 of each sinusoidal signal X0, X1, X2 to a predefined value (e.g. to zero);

ii) subtracting 702 the DC-correction values DC0, DC1, DC2 from the respective sinusoidal digital signal X0, X1, X2, thereby obtaining DC-shifted signals;

iii) clipping 703 the DC-shifted-signals to a predefined symmetrical range, thereby obtaining clipped signals, (e.g. X0sat, X1sat, X2sat of FIG. 8);

iv) calculating 704 a first sum (e.g. s0, s1, s2) by summing values of the clipped signals (e.g. X0sat, X1sat, X2sat) over one period of the respective signal;

v) calculating 705 a second sum (e.g. a0, a1, a2) by summing absolute values of the clipped signals (e.g. X0sat, X1sat, X2sat) over one period of the respective signal;

vi) updating 706 the respective DC-correction value (DC0, DC1, DC2) of each sinusoidal signal by adding a function of the first and second sum, e.g. by adding K*(s/a), where K is a predefined constant, (s) is the first sum, and (a) is the second sum.

FIG. 8 shows a data-flow diagram for illustrating the method of FIG. 7. This dataflow is performed in the digital domain. It may be implemented in a hardware circuit, or it may be implemented in software. In the inductive angular sensor circuit of FIG. 3, this algorithm is preferably implemented in the digital processing circuit 326. It is an advantage that this algorithm can easily be implemented in software, using simple algebraic functions like a summation, a subtraction, and a division. "Clipping" can be performed by comparing the value with an upper and a lower threshold, and if the value is larger than the upper threshold, replacing the value with the upper threshold, if the value is smaller than the lower threshold, replacing the value with the lower threshold, and if the value is between the upper and lower threshold, maintaining the value. Taking an absolute value is also a simple function, which can be implemented by checking the sign of the value, and if the sign is negative, changing the sign of the value.

The signal is clipped to a symmetrical range, meaning that the absolute value of the upper threshold is the same as the absolute value of the lower threshold (e.g. +70 and −70, or +130 and −130, or whichever threshold value is used for clipping).

If the nominal amplitude of the sinusoidal signals is for example the value "B" (e.g. digital value 170), then the upper threshold of the clipping range is preferably chosen to be about 70% to 90% of B, or about 75% to 85% of B, for example equal to about 80% of B (in the example 170*80%=136). Thus, in this example, the input value may be clipped to the range from −136 to +136.

As suggested in FIG. 8 by the notation X0sat[M:0], X1sat[M:0], X2sat[M:0], the clipped signals may have less bits than the digital signals X0[N:0], X1[N:0], X2[N:0]. It is one of the insights of the present invention, that the DC-correction value can be quite accurate, even when only a small number of bits are used.

Figure 9A:
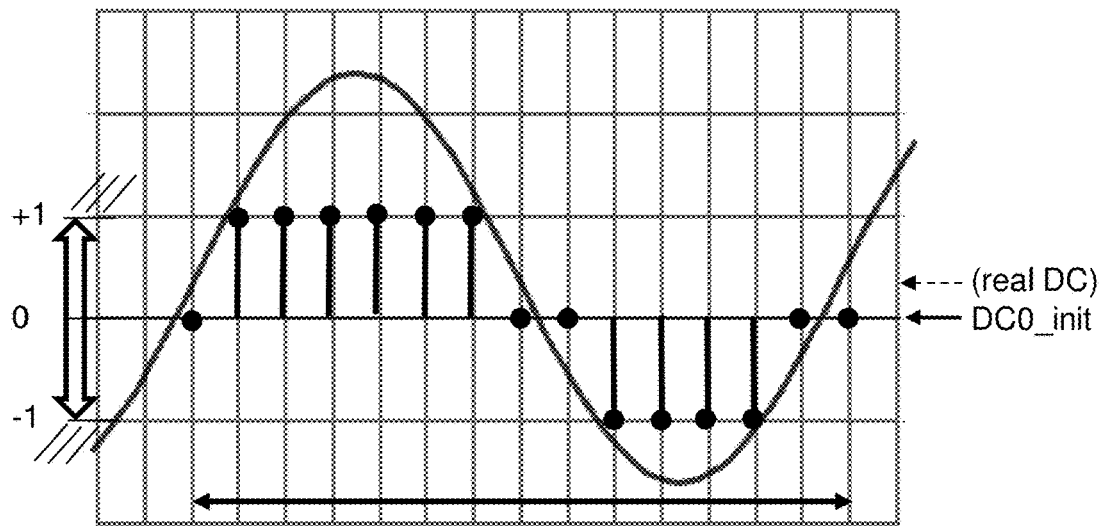
FIG. 9A shows an example of how a DC-offset-correction value can be calculated, using the algorithm illustrated in FIG. 7, by clipping to 2 bits, and by calculating a first sum and a second sum of the clipped signal.

In an embodiment which will be illustrated in FIG. 9A, the clipped signals may have only 2 bits, and assume one of the following three values: −1, 0 and +1.

Figure 9B:
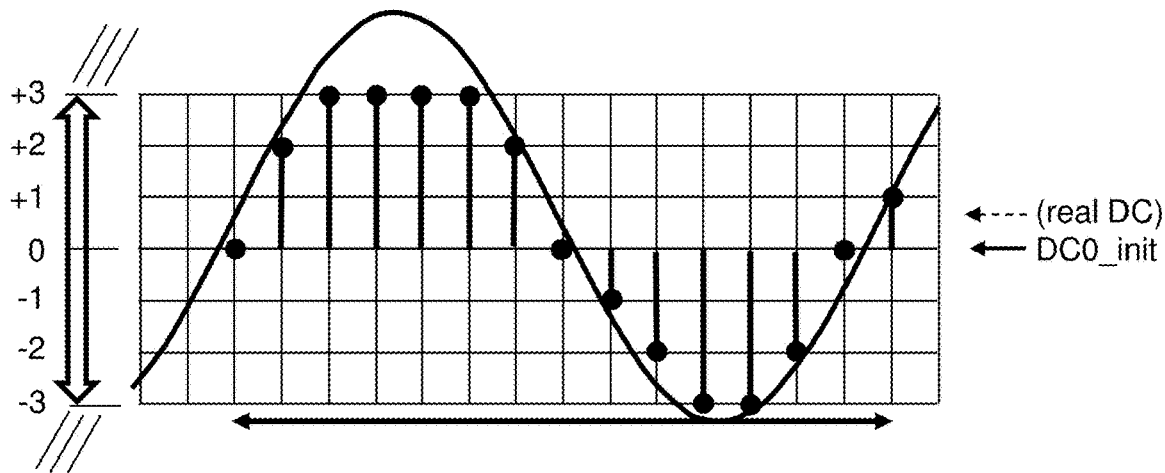
FIG. 9B shows another example of how an update of a DC-value can be calculated, using the algorithm illustrated in FIG. 7, by clipping to 3 bits, and by calculating a first sum and a second sum of the clipped signal.

In an embodiment which will be illustrated in FIG. 9B, the clipped signals may have only 3 bits, and assume one of the following seven values: −3, −2, −1, 0, +1, +2, +3.

It is an advantage that only a few bits are used, because by doing so, the risk that the sum of the absolute values over one period of the sinusoidal signal causing an overflow, is reduced or eliminated.

FIG. 9A shows an example of how a DC-offset-correction value can be calculated, using the algorithm illustrated in FIG. 7. In this example, the digital sinusoidal signal has a real DC-value indicated by "real DC", but it is assumed that the digital values are offset from zero.

In this example, the digital signal is clipped to one of three possible values: −1, 0, +1, as indicated by the black circles. It is assumed that the DC correction value is initialized to DC0_init being zero in this example (but another value could also be used). A first sum s0 is calculated as the sum of the clipped values over one period of the sinusoidal signal, in this example yielding a value of +2. And a second sum a0 is calculated as the sum of the absolute values of these values over said period, in this example yielding a value of +10. According to the present invention, the DC correction value is then updated as a function of the first sum s0 and the second sum a0, for example by adding (a constant) K times the first sum divided by the second sum. This can be written in mathematical form as:

$$DC0(\text{next iteration}):=DC0(\text{current value})+K*s0/a0,$$

or in simplified notation as:

$$DC0: =DC0+K*s0/a0,$$

where ":=" is an assignment operator, (meaning that the value is overwritten), DC0 is the DC correction value of the first digital signal, K is a predefined constant (in the example equal to 0.3, but of course, another value can be chosen as well), s0 is the first sum, and a0 is the second sum, calculated over one period of the first clipped signal (e.g. X0sat in FIG. 8). In the example of FIG. 9A, the DC correction value is increased from 0 to 0.06 in the first iteration. A new DC correction value may be updated each period.

While not explicitly shown, the DC correction values DC1 and DC2 of the other two signals can be calculated in a similar manner, which can be expressed mathematically as:

$$DC1: =DC1+K*s1/a1,$$

where s1 and a1 are the first and the second sum, calculated over one period of the second clipped signal (e.g. X1sat in FIG. 8), and $$DC2: =DC2+K*s2/a2,$$

where s2 and a2 are the first and the second sum, calculated over one period of the third clipped signal (e.g. X2sat in FIG. 8).

It is noted that the period of the first clipped signal, and the second clipped signal and the third clipped signal are typically approximately 120° phase shifted. The number of samples of this phase shift depends on the speed of the target.

It was found that the proposed technique is highly independent of the amplitude of the sinusoidal signals, and the technique works even if the signals are clipped to only two bits. But in was also found that a more stable DC value is obtained when slightly more bits are used, e.g. at least three or four bits, and when the peak-to-peak value of the clipped range is roughly equal to about 80% of the peak-to-peak value of the sinusoidal signal, or stated in other words: when the positive threshold is roughly equal to 80% of the nominal amplitude of the sinusoidal signal.

FIG. 9B shows another example of how the DC correction value can be updated, using the algorithm illustrated in FIG. 7. In this example, the digital signal is clipped to 3 bits, and the peak-to-peak value of the clipped range is approximately equal to 75% of the peak-to-peak range of the sinusoidal signal. In the example of FIG. 9B, the value of K was set to 0.4, and the DC correction value was increased from 0 to 0.09 in the first iteration.

The invention claimed is:

1. A method of determining an angular position of a target of an inductive angular position sensor system, wherein the inductive angular position sensor system further comprises: a substrate with at least one transmitter coil and a plurality of receiver coils, and a target which is movable relative to said substrate, the method comprising:
   a) receiving a plurality of input signals from said receiver coils;
   b) demodulating and optionally pairwise subtracting said plurality of input signals, and providing a plurality of sinusoidal baseband signals, each having a respective amplitude and a respective DC-offset;
   c) digitizing said plurality of sinusoidal baseband signals or digitizing pairwise difference signals derived therefrom, and providing a set of digital signals;
   d) reducing the respective DC-offset-value for each of the digital signals in an iterative manner, thereby providing a plurality of DC-compensated signals;
   e) determining an angular position of the target based on the DC compensated signals;
   wherein step d) comprises:
      i) initializing a DC correction value;
      ii) subtracting the DC correction value from the digital signal to obtain a DC-shifted signal;
      iii) clipping the DC-shifted-signal to obtain clipped signals;
      iv) calculating a first sum by summing values of the clipped signal over one period;
      v) calculating a second sum by summing absolute values of the clipped signal over said period;
      vi) adjusting the DC-correction value by a function of a ratio of the first sum and the second sum.

2. The method of claim 1, wherein step d) comprises:
   i) initializing each DC offset value to a predefined value; and repeatedly performing the following steps:
   ii) subtracting the DC-correction value from the respective digital signal, thereby obtaining DC-shifted signals;
   iii) clipping the DC-shifted-signals to a predefined symmetrical range, thereby obtaining clipped signals;
   iv) calculating the first sum value by summing values of the clipped signal over one period of the respective signal;
   v) calculating the second sum value by summing absolute values of the clipped signal over said one period;
   vi) updating the DC-correction values using the following formulas:

$$DC0: =DC0+K*(s0/a0);$$

$$DC1: =DC1+K*(s1/a1);$$

$$DC2: =DC2+K*(s2/a2);$$

where ":=" is an assignment operator, s0, s1, s2 are the first sum values; a0, a1, a2 are the second sum values; and K is a predefined constant; and going back to step ii).

3. The method according to claim 2, wherein an amplitude of the symmetrical range is a value from about 75% to about 85% of the nominal or average value of the signal amplitude.

4. The method according to claim 2, wherein step iii) further comprises: dynamically adjusting the symmetrical range such that an amplitude of the symmetrical range is a value from about 75% to about 85% of the nominal or average value of the signal amplitude.

5. The method according to claim 1, further comprising:
providing an AC signal for exciting said transmitter coil; and wherein the demodulation of step b) is performed in synchronism with said AC signal.

6. The method according to claim 1, wherein the plurality of sinusoidal baseband signals or the plurality of pairwise difference signals are three-phase signals;

wherein step b) comprises:

converting the three-phase signals to quadrature signals;

determining the angular position using an arctangent function of a ratio of the quadrature signals.

7. The method according to claim 1, wherein step c) comprises:

digitizing said signals using an analog-to-digital convertor that provides at least 12 bits; and wherein step iii) comprises: providing the clipped values with at most 8 bits.

8. The method according to claim 1, wherein step c) comprises:

digitizing said signals using an analog-to-digital convertor that provides at least 12 bits; and wherein step iii) comprises: providing the clipped values with at least 2 bits.

9. The method according to claim 1, wherein the method further comprises estimating or calculating an angular speed of the target.

10. The method according to claim 9, wherein step c) comprises:

digitizing said signals using an analog-to-digital convertor that provides at least 12 bits; and wherein step iii) comprises: providing the clipped values with a number of bits in the range from 2 to 8, the number of bits being dynamically adjusted depending on the estimated speed.

11. The method according to claim 1, wherein the moment of start and the moment of end of each respective period is determined based on the moment at which the DC-compensated signals cross a corresponding DC offset value.

12. An inductive position sensor device for use in an inductive angular position sensor system, wherein the inductive angular position sensor system further comprises a substrate with at least one transmitter coil and a plurality of receiver coils, and a target which is movable relative to said substrate;

wherein the inductive position sensor device comprises:

a plurality of inputs for receiving a plurality of input signals obtained from said plurality of receiver coils;

a demodulation circuit for demodulating and optionally pairwise subtracting said plurality of input signals, and providing a plurality of sinusoidal signals;

at least one analog-to-digital convertor for digitizing said plurality of sinusoidal baseband signals or for digitizing pairwise difference signals derived therefrom, and providing a set of digital signals;

a digital processing circuit configured for performing step d) and e) of the method of claim 1.

13. An inductive position sensor system comprising:

an inductive position sensor device according to claim 12;

a substrate with at least one transmitter coil and a plurality of receiver coils;

a target which is movable relative to said substrate.

* * * * *